Patented Nov. 19, 1946

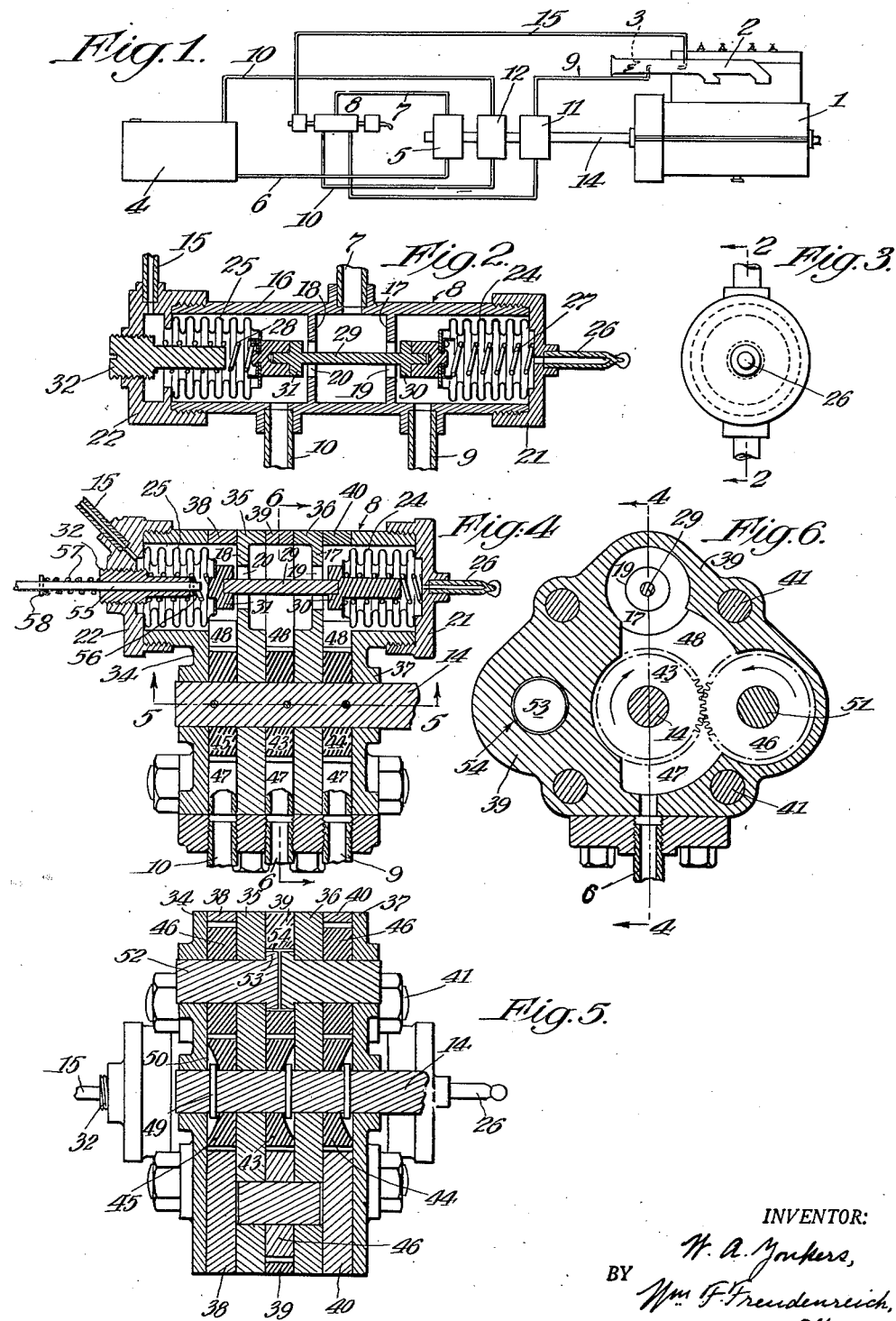

2,411,312

UNITED STATES PATENT OFFICE 2,411,312

FUEL DELIVERY SYSTEM FOR INTERNAL-COMBUSTION ENGINES

William A. Yonkers, Northfield Township, Cook County, Ill.

Application January 20, 1943, Serial No. 472,974

3 Claims. (Cl. 158—36.4)

The present invention relates to the control of fuel delivered to that type of internal combustion engine in which air is taken into a combustion chamber directly from the outside atmosphere and forms with the fuel a combustible mixture. The object of the invention is to proportion accurately the masses of air and fuel in each charge to obtain a maximum efficiency under all of the variable conditions encountered in actual operation.

When fuel is delivered to an engine by a pump driven by the engine or in some other way to insure that its speed varies directly with the speed of the engine, the same amount of fuel is moved toward the engine during each revolution or operating cycle of the pump or of the engine. However, the mass of air entering the combustion chamber per revolution may vary greatly due to shifting the position of a throttle valve, a reduction in speed without change in the position of the throttle valve, or to changes in the pressure of the surrounding atmosphere, particularly when the engine passes from one level to a higher or lower one, or to a combination of these main factors. Obviously, if, at a given speed of the engine, a proper combustible mixture is achieved when the pressure of the air entering the combustion chamber has a certain value, the perfect balance between air and fuel is disturbed in the case of either a higher or lower pressure.

Viewed in one of its aspects, therefore, the present invention may be said to have for its object to provide simple and reliable means to effect a relative adjustment between the mass of air and the mass of fuel forming each individual charge for an internal combustion chamber to maintain the proper proportioning of air and fuel entering the combustion chamber, regardless of variations in the pressure of the air and even though the speed of the pump relative to that of the engine remains constant.

In carrying out my invention, I employ a pump, so driven, preferably by the engine, that it discharges fuel equal to the maximum demand which may be made by the engine during any complete revolution thereof; the output of the pump being divided into two streams one of which flows to the engine and the other back to the fuel reservoir; and the proportioning of the fuel in the two streams being determined by a valve which operates in response to variations in the pressure of the air entering the combustion chamber. In this way the lower the absolute pressure of the air entering the combustion chamber, the less will be the amount of fuel delivered during any given revolution or engine cycle regardless of the engine speed, and the proper ratio between air and fuel is at all times maintained.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a diagrammatic view illustrating a multi-cylinder internal combustion engine provided with a fuel delivering system embodying the present invention; Fig. 2 is a longitudinal section, on a larger scale, of a typical differential valve forming part of the system, the section being on line 2—2 of Fig. 3; Fig. 3 is an end view of the device shown in Fig. 2; Fig. 4 is a central axial section through a unit containing not only the valve device but also the several pumps appearing in the diagram, the section being on line 4—4 of Fig. 6; Fig. 5 is a section on line 5—5 of Fig. 4; and Fig. 6 is a section on line 6—6 of Fig. 4.

Referring to Fig. 1 of the drawing, 1 represents an internal combustion engine having an inlet manifold 2 provided with a throttle valve 3 past which the air entering the engine must pass. Fuel for the engine is taken from a reservoir 4 by a pump 5 through pipe 6 and is discharged through pipe 7 into a valve device 8. The fuel may leave the valve device through either or both of two pipes 9 and 10, one of which leads to the manifold between the throttle valve and the combustion chamber and the other back to the fuel reservoir. In the most highly developed form of the system the pipes 9 and 10 contain pumps 11 and 12, respectively, to cause the two streams of fuel to be driven positively to their destinations. The pump 5 and the pumps 11 and 12, when used, are conveniently driven by an extension 14 of the engine shaft. It will be seen that there is a pipe 15 leading from the manifold, inwardly from the throttle valve, to the valve device 8, the purpose of which will now be explained.

The valve device 8, as illustrated in Fig. 2, comprises an open-ended cylindrical shell 16 provided with two parallel transverse partitions 17 and 18 disposed on opposite sides of the inlet from pipe 7 which is about midway between the ends of the shell. These partitions have central ports 19 and 20, respectively. The ends of the shell are closed by detachable heads 21 and 22, respectively; and, attached with each head and forming therewith a contractile and expansible sealed chamber, is a bellows device indicated at 24 and 25, respectively. The pipe 15 opens directly into the chamber of which the bellows 25 forms a part, whereas the sealed chamber at the other end of the device contains a partial vacuum, air having been withdrawn through the little tube 26, closed at its outer end. Within the right hand sealed chamber is a compression spring 27 and in the other sealed chamber is a weaker compression spring 28. Extending between and connecting together the inner ends of the bellows devices is a rigid tie rod 29 that passes through both ports 19 and 20. On this rod are two valves 30 and 31 cooperating with the ports 19 and 20, respectively.

Normally, when the engine is standing still, both of the ports, 19 and 20 are partly open, say to an equal extent. The initial adjustment of the valves 30 and 31 may be effected by adjusting the initial compression of one of the springs. In the arrangement shown, the spring 28 bears against a plug 32 screwed into the center of the head 22. Therefore, by screwing the plug in or out, the compression of the spring may be increased or decreased, thereby causing the double valve unit to move bodily toward the right or toward the left until a balancing of opposing forces is reached. Before the engine begins to turn over the fluid pressure in the left hand sealed chamber, which communicates with the engine intake manifold, is that of the surrounding atmosphere varying, of course, with the distance above sea level at which the engine is located. When the engine begins to operate the pressure in that chamber varies with the pressure of the air entering the combustion chamber. In other words, the valves 30 and 31 are moved by opposing forces all of which, except that exerted by the fluid in the left hand sealed chamber, are constant. Consequently the positions of the valves 30 and 31 at all times depend solely on the pressure of the air at the point of entry into the combustion chambers of the engine. Such being the case, the double valve unit moves toward the left as the pressure of the air entering the combustion chamber decreases, further closing the port 19 and opening the port 20 wider; causing more of the fuel to flow through the latter port and back to the reservoir while less reaches the engine. By properly proportioning the parts, the double valve unit automatically moves back and forth so that the fuel is always caused to be delivered in measured quantities properly proportioned to the quantity of air with which it must be mixed to obtain the highest degree of efficiency.

Since the pipe 10 opens into the fuel reservoir, the condition of the air pressure in the latter may to some extent affect the accuracy with which the desired ratio between air and fuel is achieved. This can be prevented by the use of the pumps 11 and 12 which not only move the two streams of fuel positively but also act as check valves to prevent back pressure due to conditions beyond these pumps.

In Figs. 4 to 6 there is illustrated a simple construction in which all of the parts of my improved system, except a few of the pipes shown in Fig. 1, are contained in a single compact unit. The body portion of the device is composed of four plate-like elements 34, 35, 36 and 37 held apart from each other by spacers 38, 39 and 40. These seven parts are so formed and machined that when fastened together in a rigid, compact unit, as by means of bolts 41, they form the necessary arrangement to produce the body portion of the valve device 8 of Fig. 2; the ends of such body portion being closed by caps 21 and 22 as before. Three pump chambers are formed in the spacing members, one at the center of each of those members. In those chambers are located three thick disks 43, 44 and 45 mounted on shaft 14 and having peripheral gear teeth. The teeth on each of these disks mesh with complementary teeth on disk 46 rotatably mounted in a lateral branch of the corresponding pump chamber. As best shown in Fig. 6, the pipe 6 communicates with a downward extension 47 of the pump chamber in which the toothed disk 43 and the cooperating disk 46 rotate. Above the disks 43 and 46 is another extension 48 of this pump chamber which opens into the space between the partitions 17 and 18 in the differential valve device. Therefore, when the disks 43 and 46 rotate in the directions of the arrows in Fig. 6, fuel is pumped from the reservoir into the differential valve casing.

The other two pumps are just like the one just described except that the toothed disk members 46 thereof are diametrically opposite that cooperating with disk on wheel 43. The extensions 47 and 48 of the pump chambers in the case of these other pumps are symmetrically disposed with respect to those appearing in Fig. 6 on the opposite side of a central vertical plane containing the axis of the shaft 14; the extensions 48 serving in these instances as the inlets to the pumps from the differential valve device and the extensions 47 serving to supply fuel to the pipes 9 and 10 respectively.

The wheels or disks 43, 44 and 45 may be secured to the shaft 14 by means of keys or pins 49 driven through and projecting at opposite ends from the shaft and lying in little grooves 50 cut in one side of each of the wheels or disks. By cutting these grooves with a circular saw they will serve to prevent accidental endwise movements of the pins when seated against the wheels or disks. The wheels or disks 46 may be loose on their shafts and the shafts themselves need not be fixed against rotary movements. In the arrangement shown, a short shaft 51, having a bearing in each of the plates 35 and 36, supports the member 46 that cooperates with the wheel 43. Each of the other two idler toothed wheels is rotatable on a shaft 52 having at its inner end a head 53. One of these shafts extends through the end plate 34, a toothed wheel and the plate 35, whereas the other extends through the other end plate 37, a toothed wheel and plate 36. The head on each of the shafts 52, which are aligned with each other as shown in Fig. 5, lies in a hole 54 in the central spacing member or plate 39, thereby preventing the shafts from dropping out after the assembly has been completed.

It may be advantageous to be able to control the differential valve device so as to permit the valve 30 to be opened to any desired extent independently of the pressure in the engine manifold. For example, it may be desirable to provide a rich mixture in starting an engine, in which case the valve 30 should be opened more widely than would otherwise be the case.

I have therefore shown a simple means to do this, the same consisting of a rod 55 extending axially through and slidable in the plug 32. A shoulder, shown as being a pin 56, extending transversely through the rod at the inner end of the plug, prevents the rod from being pulled out. A light compression spring 57 surrounds the rod outwardly from the plug between a bearing at its ends against the end of the plug and a pin or shoulder 58 on the rod.

The parts are so proportioned that normally the spring 57 holds the rod retracted so far away from the valve 31 as not to interfere with the normal operation of the differential valve as heretofore described. However, when the rod is pushed in far enough it engages with the valve 31 and forces the double-valve unit toward the right as viewed in Fig. 4. Upon release of the rod the spring 57 returns it to its neutral position.

Although I have shown no means for operating the rod, it will of course be understood the operation thereof may be manual or according to any other suitable method.

It will thus be seen that I have produced a simple and novel system whereby a predetermined ratio between the mass of air and the mass of fuel is automatically maintained under all conditions encountered during operation of an internal combustion engine in the air or on the ground or water; thereby avoiding the waste of fuel which results from the usual methods of regulating the quantities of fuel entering internal combustion engines, as well as the objectionable consequences incident to incomplete combustion.

It will also be seen that all of the mechanism required, even in the mostly highly developed form of the invention, may be incorporated in a very simple, rugged, compact unit that is easy to construct and maintain.

It should be noted that while I have illustrated my invention as applied to an engine in which air from the surrounding atmosphere enters the combustion chamber, because of the partial vacuum created therein during each intake stroke, any gaseous fluid to support combustion such as oxygen, for example, may be delivered to the engine in any usual or suitable way provided that conditions are created that make the use of my invention advisable. Therefore I do not desire to be limited to the exact details thus illustrated and described; but intend to cover all forms and arrangements which come within the definitions of my invention constituting the appended claims, wherein the word air is employed in the broad sense of a gaseous fluid for supporting combustion.

I claim:

1. A fuel feeding means comprising a housing containing three pump chambers arranged side by side and a valve chamber divided into three sections of which the central one communicates with the outlet side of the central pump chamber while the others communicate respectively with the inlet sides of the other pump chambers, and a differential valve in the valve chamber to control the relative amounts of fuel which can flow from the central section of the valve chamber into each of the end sections of the latter.

2. A fuel feeding means comprising a housing containing three pump chambers arranged side by side and a valve chamber containing two spaced partitions that divide it into three sections of which the central one communicates with the outlet side of one of the pump chambers while the others communicate with the inlet sides of the second and third pump chambers respectively, said partitions having ports therethrough, and a compound differential valve in the valve chamber cooperating with said ports to control the relative amounts of fuel that can flow from the central section of the valve chamber into each of the other two sections.

3. In a fuel delivery system for an internal combustion engine provided with an intake through which the fuel and a medium to supply oxygen needed for combustion enter, and wherein there is an engine driven pump having its inlet connected to a fuel source and its outlet connected to a conduit, which conduit in turn is connected to two branch conduits so that the said pump discharges fuel into said branch conduits in positively driven streams at a rate determined by the engine speed, and only one of which branch conduit is connected to said intake: valve means including two valves one of which is located in one of said branch conduits for controlling the flow of fuel therethrough, while the other is located in the other of said branch conduits for controlling the flow of fuel therethrough; and a pump located in each of the branch conduits beyond the valves for positively moving fuel through the branch conduits and preventing back flow.

WILLIAM A. YONKERS.